UNITED STATES PATENT OFFICE 2,205,594

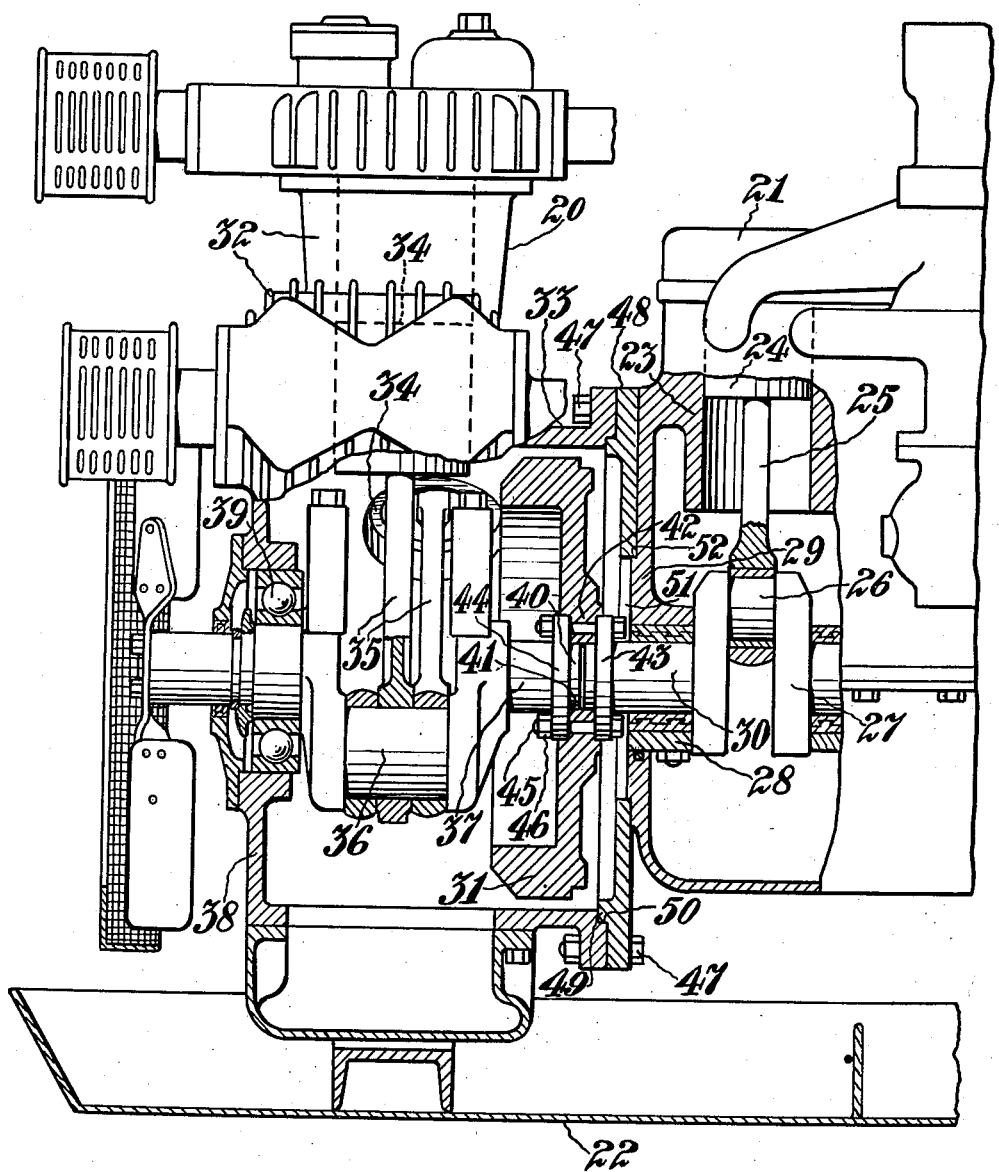

COMPRESSOR OUTFIT

Joseph W. Jones, Corning, N. Y., assignor to Ingersoll-Rand Company, Jersey City, N. J., a corporation of New Jersey Application June 12, 1937, Serial No. 147,846

1 Claim. (Cl. 74—595)

This invention relates to compressors, and more particularly to compressor outfits of the portable type of which the compressor and the motor driving it are arranged in end to end relationship and have their shafts connected directly together.

One object of the invention is to minimize the space required to accommodate the compressor and its motor.

Another object is to minimize the cost of manufacturing and simplify the construction of the compressor outfit.

Still another object is to provide a compact, light weight and rugged compressor outfit in which the compressor and its motor are rigidly connected together and may, therefore, be conveniently handled as a unit.

Other objects will be in part obvious and in part pointed out hereinafter.

The drawing accompanying this specification and illustrating a preferred embodiment of the invention is a longitudinal elevation, partly broken away, of a compressor and the motor driving it.

Referring more particularly to the drawing, 20 designates a compressor, 21 a motor for driving the compressor and 22 a support upon which the compressor and the motor may be mounted.

The motor 21 is illustrated as being in the form of an internal combustion engine, preferably of the multi-cylinder type, of which only an end cylinder 23 is shown in detail. The cylinder 23 contains a piston 24 which is connected, as by means of a rod 25, to a pin 26 of the crank shaft 27 of the motor. The crank shaft is supported by the usual bearings of which an end bearing designated 28 is arranged in an end wall 29 of the motor casing and the portion 30 of the shaft 27 journaled in the bearing 28 extends exteriorly of the motor casing and supports a fly-wheel 31.

The compressor 20, selected for illustrative purposes, is of the radial type of which a plurality of cylinders 32 are arranged in V-fashion on the compressor casing 33 and the pistons 34 contained by the cylinders 32 are connected by rods 35 to the same crank pin 36 of a crank shaft 37 arranged coaxially with the crank shaft 27 of the motor.

In the end wall 38 of the casing 33 remote from the motor is an anti-friction bearing 39 for one end of the crank shaft 37 and, in accordance with the practice of the invention, the opposite end 40 of the crank shaft 37 is supported by the fly-wheel 31 which has a bore 41 to receive the contiguous ends of the shafts 27 and 37.

The fly-wheel 31 lies within the compressor casing 33 and in the ends of its hub 42 are annular recesses to receive flanges 43 and 44 carried by the shafts 27 and 37, respectively. The flanges may be integral portions of the shafts carrying them. They are keyed to the fly-wheel by bolts 45 extending through them and through the fly-wheel and nuts 46 threaded on the bolts 45 and acting against one of the flanges serve to clamp the fly-wheel 31 securely between the flanges.

In order to assure the correct alignment of the bearings supporting the shafts 27 and 37 the motor and compressor casings are secured rigidly together by bolts 47 which engage the adjacent ends of both casings and also clamp an adapter plate 48 between the casings. On one side of the plate 48 is a boss 49 which seats in a recess 50 in the end of the motor casing 33 and a bore 51 in the plate accommodates a boss 52 on the outer surface of the wall 29 of the motor casing to centralize the motor casing with the compressor and, therefore, maintain the shafts 27 and 37 in coaxial alignment.

In practice, the present invention has been found to be highly desirable in apparatus of the character to which it pertains. By disposing the fly-wheel of the motor within the compressor casing and coupling the compressor shaft to the fly-wheel the overall dimensions of the motor and the compressor may be considerably reduced and only one compressor bearing will be required.

I claim:

A device of character described comprising two casings, a drive shaft in one casing, a driven shaft in the other casing, flanges on the shafts, a bearing for one end of the driven shaft, a fly-wheel on the driving shaft forming the sole support for the other end of the driven shaft and lying solely within one of the casings, and means for clamping the fly-wheel between the flanges.

JOSEPH W. JONES.